United States Patent
Oh et al.

(10) Patent No.: US 11,853,570 B2
(45) Date of Patent: Dec. 26, 2023

(54) CONTROLLER AND MEMORY SYSTEM HAVING THE CONTROLLER

(71) Applicant: SK hynix Inc., Gyeonggi-do (KR)

(72) Inventors: Chan Young Oh, Gyeonggi-do (KR); Hoe Seung Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/368,458

(22) Filed: Jul. 6, 2021

(65) Prior Publication Data

US 2022/0214807 A1 Jul. 7, 2022

(30) Foreign Application Priority Data

Jan. 7, 2021 (KR) .......................... 10-2021-0002205

(51) Int. Cl.
*G06F 3/06* (2006.01)

(52) U.S. Cl.
CPC ............ *G06F 3/064* (2013.01); *G06F 3/0604* (2013.01); *G06F 3/0655* (2013.01); *G06F 3/0679* (2013.01)

(58) Field of Classification Search
CPC .... G06F 3/0604; G06F 3/0655; G06F 3/0647; G06F 3/0611; G06F 12/0246
See application file for complete search history.

(56) References Cited

U.S. PATENT DOCUMENTS

| | | | | |
|---|---|---|---|---|
| 11,030,094 B2 * | 6/2021 | Yi | ........................ | G06F 12/0891 |
| 2007/0271439 A1 * | 11/2007 | Mastouri | ............. | G06F 12/0246 |
| | | | | 711/202 |
| 2015/0248244 A1 * | 9/2015 | Seo | ........................ | G06F 3/0647 |
| | | | | 711/103 |
| 2017/0109085 A1 * | 4/2017 | Jinzenji | .................... | G06F 3/064 |
| 2019/0258593 A1 * | 8/2019 | Jung | .................... | G11C 7/1057 |
| 2019/0369899 A1 * | 12/2019 | Tanpairoj | .............. | G06F 1/3234 |
| 2020/0034299 A1 * | 1/2020 | Lee | ....................... | G06F 12/0246 |
| 2020/0042238 A1 * | 2/2020 | Jung | ..................... | G06F 3/0679 |
| 2021/0055990 A1 * | 2/2021 | Iwasaki | ................ | G06F 12/0253 |
| 2021/0191873 A1 * | 6/2021 | You | ......................... | G11C 7/106 |
| 2022/0057952 A1 * | 2/2022 | Bueb | ..................... | G06F 3/0659 |
| 2022/0164123 A1 * | 5/2022 | Kim | ........................ | G06F 3/0659 |
| 2023/0076210 A1 * | 3/2023 | Kanno | .................... | G06F 3/061 |

FOREIGN PATENT DOCUMENTS

| | | |
|---|---|---|
| KR | 10-2015-0103532 A | 9/2015 |
| KR | 10-2019-0041023 A | 4/2019 |
| KR | 10-2147916 B1 | 8/2020 |

* cited by examiner

*Primary Examiner* — Francisco A Grullon
(74) *Attorney, Agent, or Firm* — IP & T GROUP LLP

(57) ABSTRACT

A memory system includes: a memory device including first memory blocks, within which a single bit is to be programmed into a memory cell by using a single level cell (SLC) method, and second memory blocks, within which two or more bits are to be programmed into a memory cell by using a multi-level cell (MLC)-or-more method, and a controller configured to program first data in the first memory blocks by using the SLC method and then migrate the first data from the first memory blocks into the second memory blocks by using the MLC-or-more method, wherein the controller is further configured to read the first or second memory blocks according to a number of free blocks included in the first memory blocks, when the read request for the second memory block is received after the specific amount of time.

8 Claims, 13 Drawing Sheets

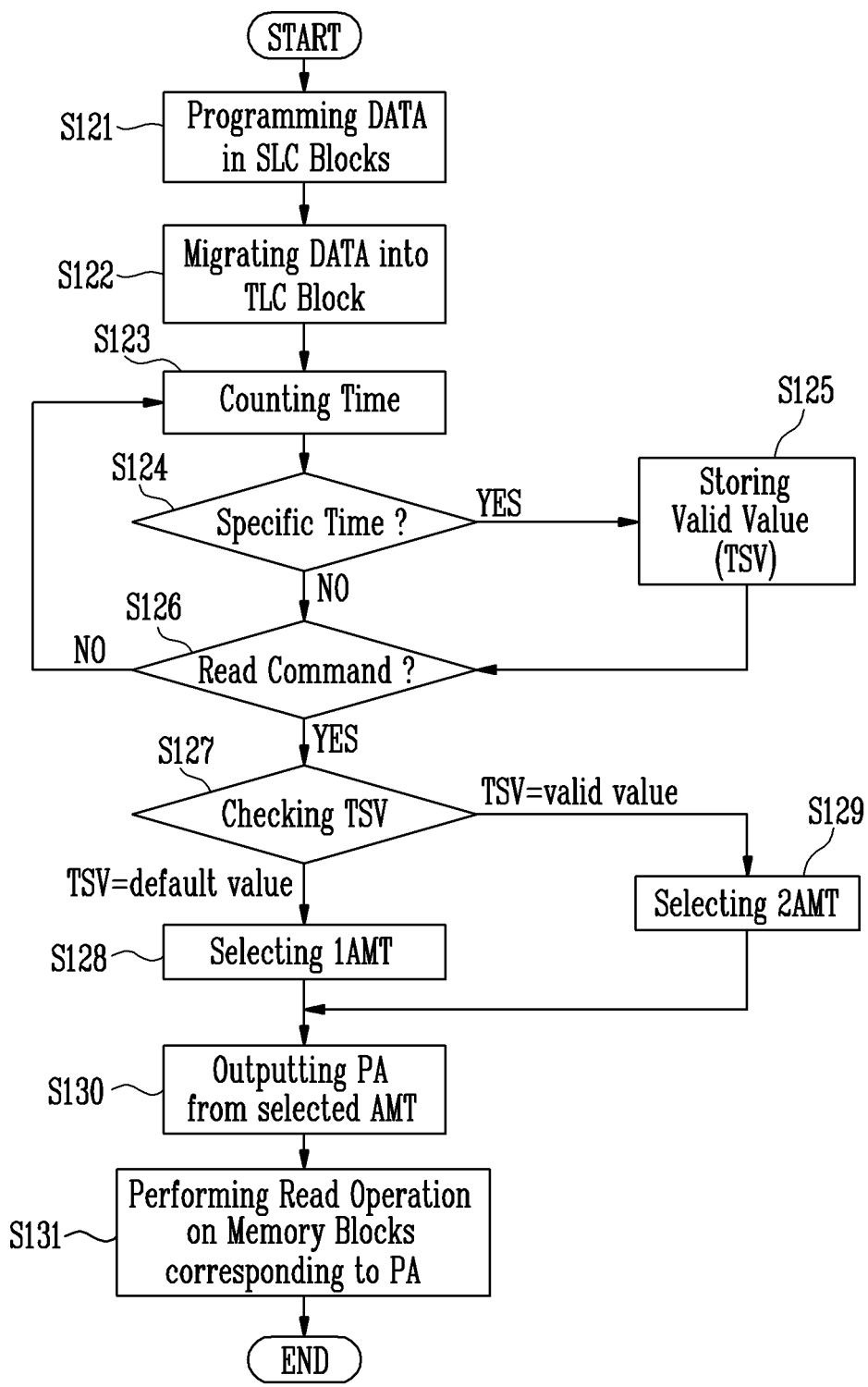

CONTROLLER AND MEMORY SYSTEM HAVING THE CONTROLLER

CROSS-REFERENCE TO RELATED APPLICATION

The present application claims priority under 35 U.S.C. § 119(a) to Korean patent application number 10-2021-0002205 filed on Jan. 7, 2021, which is incorporated herein by reference in its entirety.

BACKGROUND

Field of Invention

The present disclosure generally relates to a controller and a memory system having the controller, and more particularly, to a controller capable of mapping a logical address and a physical address and managing the mapped addresses, and a memory system having the controller.

Description of Related Art

A memory system may include a memory device in which data is stored and a controller capable of controlling the memory device. The memory device is classified into a volatile memory device and a nonvolatile memory device. Since volatile memory devices have different characteristics, each of the volatile memory devices is used for a function thereof in an electronic device. For example, the volatile memory device has a speed of a program operation and a read operation, which is faster than that of the program operation and the read operation in the nonvolatile memory device, but has a characteristic that stored data disappears when the supply of power is interrupted. The nonvolatile memory device has a speed of the program operation and the read operation, which is slower than that of the program operation and the read operation in the volatile memory device, but has a characteristic that stored data is retained even when the supply of power is interrupted. Also, since the nonvolatile memory device has an integration degree higher than that of the volatile memory device, the nonvolatile memory device may store high-capacity data.

SUMMARY

Embodiments of the present disclosure provide a controller and a memory system having the controller, which can increase the speed of a read operation of the memory system which performs a migration operation.

In accordance with an aspect of the present disclosure, there is provided a memory system including: a memory device including first memory blocks, within which a single bit is to be programmed into a memory cell by using a single level cell (SLC) method, and second memory blocks, within which two or more bits are to be programmed into a memory cell by using a multi-level cell (MLC)-or-more method, and a controller configured to program first data in the first memory blocks by using the SLC method and then migrate the first data from the first memory blocks into the second memory blocks by using the MLC-or-more method, wherein the controller is further configured to read the first memory blocks when a read request for the second memory block is received from a host within a specific amount of time after the migration, read the first or second memory blocks according to the number of free blocks included in the first memory blocks, when the read request for the second memory block is received after the specific amount of time.

In accordance with another aspect of the present disclosure, there is provided a memory system including: a memory system including first memory blocks, within which a single bit is to be programmed into a memory cell by using a single level cell (SLC) method, and second memory blocks, within which two or more bits are to be programmed into a memory cell by using a multi-level cell (MLC)-or-more method, and a controller configured to store first data in the first memory blocks according to a program request of a host, and migrate the first data from the first memory blocks into the second memory blocks by using the MLC-or-more method when any request of the host does not exist, wherein the controller includes an address manager configured to manage logical addresses used in the host and physical addresses used in the memory device, and select the physical addresses to be used for a read operation based on the logical addresses according to when the read operation is requested and the number of free blocks included in the first memory blocks.

In accordance with still another aspect of the present disclosure, there is provided a controller including: a host interface configured to receive a program request or a read request from a host, and receive data from the host, an address manager configured to map first physical addresses and logical addresses, which are used in a program operation according to a request of the host, and map second physical addresses and the logical addresses, which are used in a migration operation, a memory interface configured to output a program command, the first or second physical addresses, and data to the memory device, and receive data read from the memory device, and a central processing unit configured to control the host interface, the address manager, and the memory interface according to the program request or the read request, wherein the address manager is further configured to: select the first or second physical addresses when the read request for the logical addresses is received from the host after a specific amount of time after the migration operation is performed, and select the second physical address when the read request is received after the specific amount of time.

BRIEF DESCRIPTION OF THE DRAWINGS

Various embodiments of the present disclosure will be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 12 is a flowchart illustrating an operating method of the memory system in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
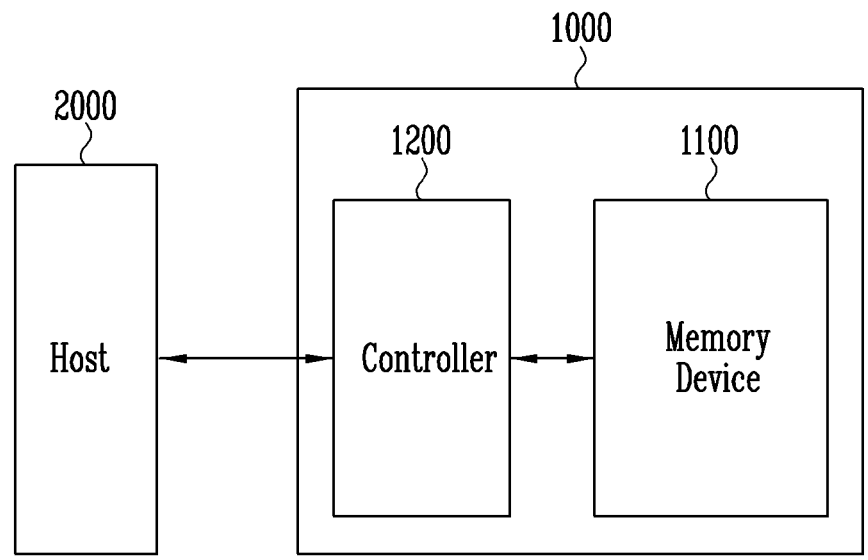
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, the memory system 1000 may be configured to store, erase or output data in response to a request of a host 2000. For example, the memory system 1000 may include a memory device 1100 capable of storing data and a controller 1200 capable of communicating between the host 2000 and the memory device 1100. Although the memory system 1000 including one memory device 1100 is illustrated in FIG. 1, two or more memory devices may be included in the memory system 1000. In this embodiment, the memory device 1100 may be configured as a nonvolatile memory device.

When a request output from the host 2000 is received, the controller 1200 may generate a command for controlling the memory device 1100 according to the request. The controller 1200 may manage a logical address used in the host 2000 and a physical address used in the memory device 1100. In a program operation, the controller 1200 may receive a logical address and data from the host 2000, map a physical address to the logical address according to a capacity of the received data, and store the mapped address. In a read operation, the controller 1200 may receive a logical address output from the host 2000, perform a read operation of the memory device 1100 according a physical address mapped to the received logical address, and output read data to the host 2000.

The controller 1200 in accordance with this embodiment may program data received from the host 2000 in a program operation by using a first method and then perform a migration operation for increasing the number of free blocks of the memory device 1100 when any request of the host 2000 does not exist or when the number of requests standing by is less than a reference number. For example, the controller 1200 may reprogram data stored in the memory device 1100 by using a second method in the migration operation. The migration operation means an operation of rapidly programming data output from the host by using a single level cell (SLC) method and then reprogramming the data by using a multi-level cell (MLC)-or-more method. That is, through the migration operation, data programmed in a plurality of memory blocks by using the SLC method may be reprogrammed in one memory block by the MLC-or-more method, which makes the storage efficiency of the memory blocks greater. The SLC method means a method in which 1-bit data is stored in one memory cell, and the MLC method means a method in which 2-bit data is stored in one memory cell. The first method may be the SLC method and the second method may be the MLC-or-more method. A triple level cell (TLC) method, a quadruple level cell (QLC) method, or the like may be applied as the MLC-or-more method. The TLC method means a method in which 3-bit data is stored in one memory cell, and the QLC method means a method in which 4-bit data is stored in one memory cell. The migration operation will be described in more detail. The memory device 1100 may include a plurality of memory blocks, and program data in the plurality of memory blocks according to the first method. Subsequently, before a program operation using the second method is performed, the memory device 1100 may read the plurality of memory blocks in which the data is programmed according to the first method, and output read data to the controller 1200. In the migration operation, the controller 1200 may reprogram the data read from the SLC block of the memory device 1100 in one memory bock (i.e., a multiple-level-cell block such as a multi-level cell block, a triple-level cell block and a quadruple-level cell block) included in the memory device 1100 by using the second method. When a specific amount of time elapses after the migration operation is performed, the memory blocks in which the data is programmed by using the first method may be erased, to become free blocks. When the migration operation is performed as described above, the number of free blocks in the memory device 1100 increases, and thus the memory device 1100 can store a large amount of data, as compared with when data is programmed by using only the first method.

The controller in accordance with this embodiment may perform a read operation of a memory block in which data is programmed by using the first method, when a read request is received from the host 2000 within the specific amount of time after the migration operation is performed, and perform a read operation of a memory block in which data is programmed by using the second method, when a read request is received after the specific amount of time.

Figure 2:
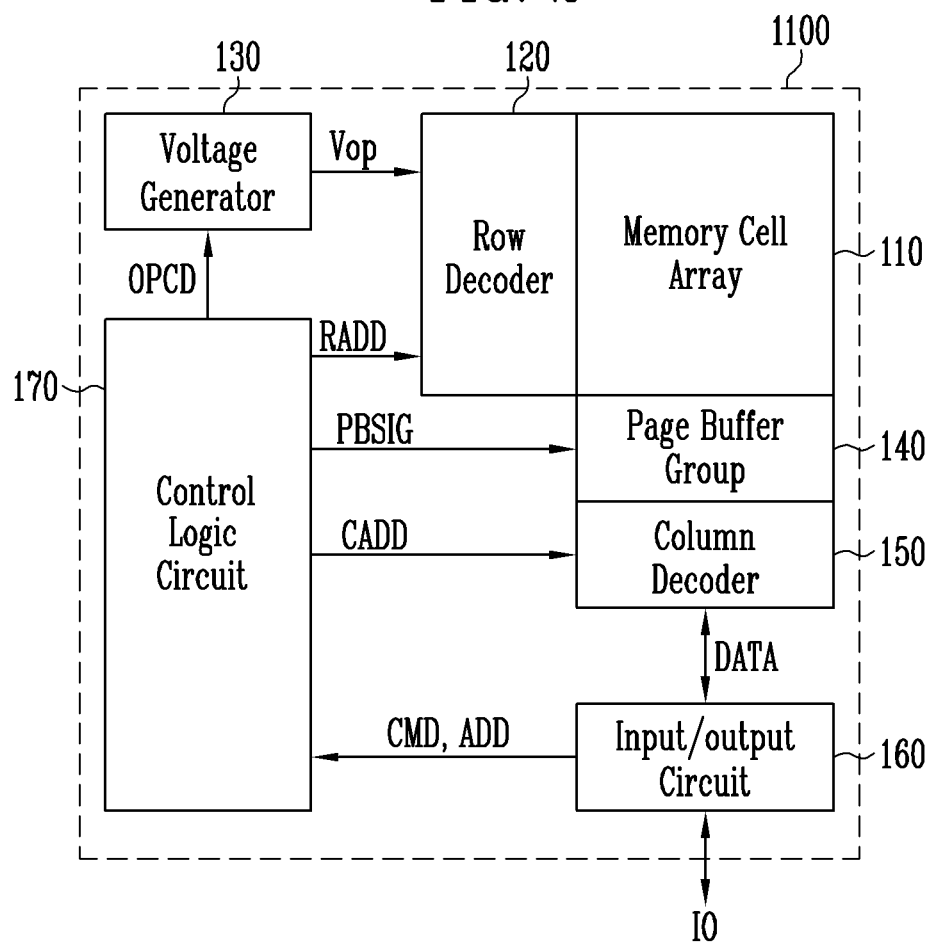
FIG. 2 is a diagram illustrating a memory device shown in FIG. 1, in accordance with an embodiment of the present disclosure.

FIG. 2 is a diagram illustrating the memory device shown in FIG. 1, in accordance with an embodiment of the present disclosure.

Referring to FIG. 2, the memory device 1100 may include a memory cell array 110 in which data is stored and a peripheral circuit capable of performing a program, read or erase operation.

The memory cell array 110 may include a plurality of memory blocks in which data is stored. Each of the memory blocks may include a plurality of memory cells, and the memory cells may be implemented in a two-dimensional structure in which the memory cells are arrange in parallel to a substrate or a three-dimensional structure in which the memory cells are stacked in a vertical direction to a substrate.

The peripheral circuit may include a row decoder 120, a voltage generator 130, a page buffer group 140, a column decoder 150, an input/output circuit 160, and a control logic circuit 170.

The row decoder 120 may select one memory block among the memory blocks included in the memory cell array 110 according to a row address RADD, and transmit operating voltages Vop to the selected memory block.

The voltage generator 130 may generate and output the operating voltages Vop necessary for various operations in response to an operation code OPCD. For example, the voltage generator 130 may generate a program voltage, a read voltage, an erase voltage, a pass voltage, a verify voltage, a negative voltage, and the like in response to the operation code OPCD, and selectively output the generated voltages.

The page buffer group 140 may be connected to the memory cell array 110 through bit lines. For example, the page buffer group 140 may include page buffers connected to the respective bit lines. The page buffers may simultaneously operate in response to page buffer control signals PBSIG, and temporarily store data in a program or read operation. The page buffers may sense a voltage of the bit lines, which varies according to threshold voltages of the memory cells, in a read operation or a verify operation. That is, it may be determined whether the threshold voltages of the memory cells are lower or higher than a read voltage or a verify voltage, according to a result of the sensing operation performed on the page buffers.

The column decoder 150 may transmit data DATA between the input/output circuit 160 and the page buffer group 140 according to a column address CADD.

The input/output circuit 160 may be connected to the controller (1200 shown in FIG. 1) through input/output lines 10. The input/output circuit 160 may input/output a command CMD, an address ADD, and data DATA through the input/output lines 10. For example, the input/output circuit 160 may transmit a command CMD and an address ADD, which are received from the controller 1200, to the control logic circuit 170 through the input/output lines 10, and transmit data DATA received from the controller 1200 to the column decoder 150 through the input/output lines IO. The input/output circuit 160 may output data DATA received from the column decoder 150 to the controller 1200 through the input/output lines IO.

The control logic circuit 170 outputs the operation code OPCD, the row address RADD, the page buffer control signals PBSIG, and the column address CADD in response to the command CMD and the address ADD. For example, control logic circuit 170 may include software for performing an algorithm in response to the command CMD and hardware for outputting various signals according to the address ADD and the algorithm.

Figure 3:
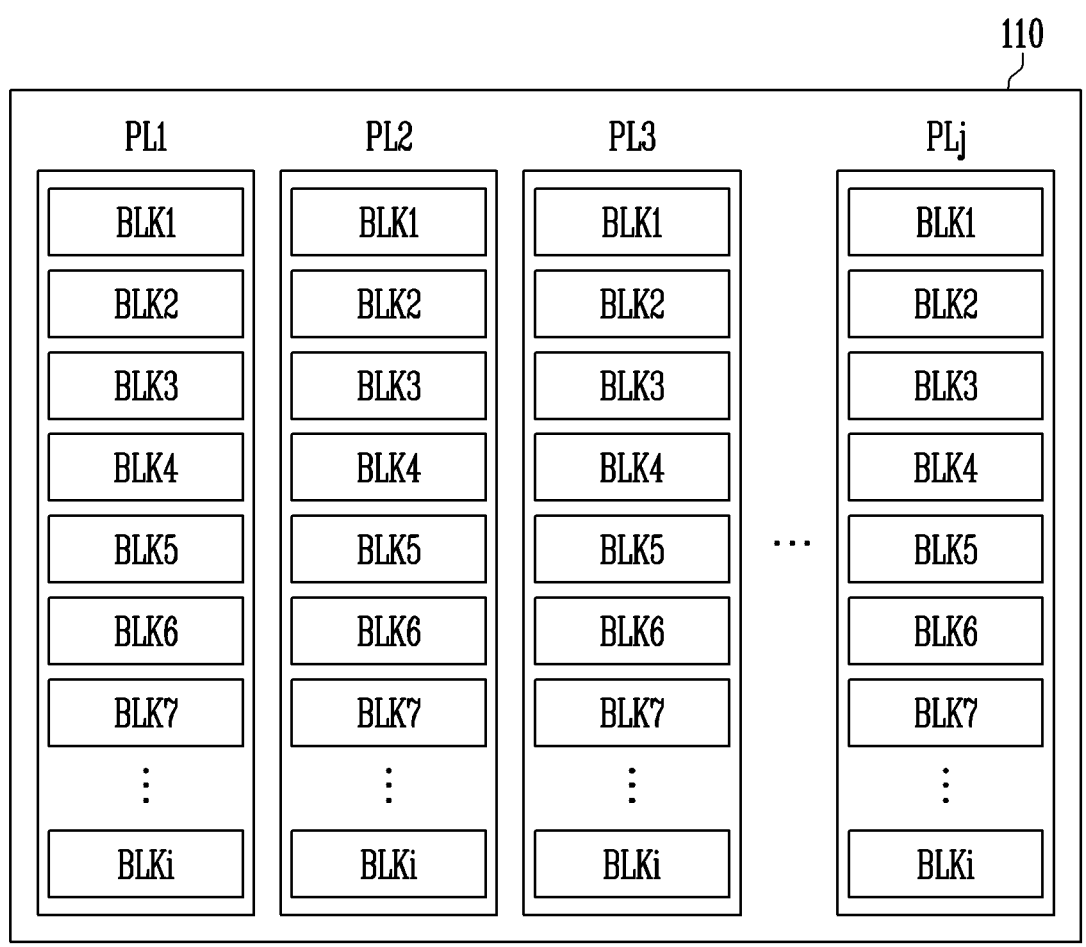
FIG. 3 is a diagram illustrating a memory cell array shown in FIG. 2, in accordance with an embodiment of the present disclosure.

FIG. 3 is a diagram illustrating the memory cell array shown in FIG. 2, in accordance with an embodiment of the present disclosure.

Referring to FIG. 3, the memory cell array 110 may be configured with a single plane or a multi-plane. The single plane means a configuration in which only one plane is included in the memory cell array 110, and the multi-plane means a configuration in which a plurality of planes are included in the memory cell array 110. In FIG. 3, the memory cell array 110 configured with a multi-plane is illustrated. Planes PL1 to PLj (where j is a positive integer) may be defined as a memory area in which different row decoders and different page buffer groups are connected to each other. For example, when first to jth planes PL1 to PLj are included in the memory cell array 110, each of the first to jth planes PL1 to PLj may include first to ith memory blocks BLK1 to BLKi (where i is a positive integer). First to ith memory blocks BLK1 to BLKi included in different planes may be connected to different row decoders and different page buffer groups, and first to ith memory blocks BLK1 to BLKi included in the same plane may be connected to the same row decoder and the same page buffer group. The first to ith memory blocks BLK1 to BLKi may be configured in the same structure.

Figure 4:
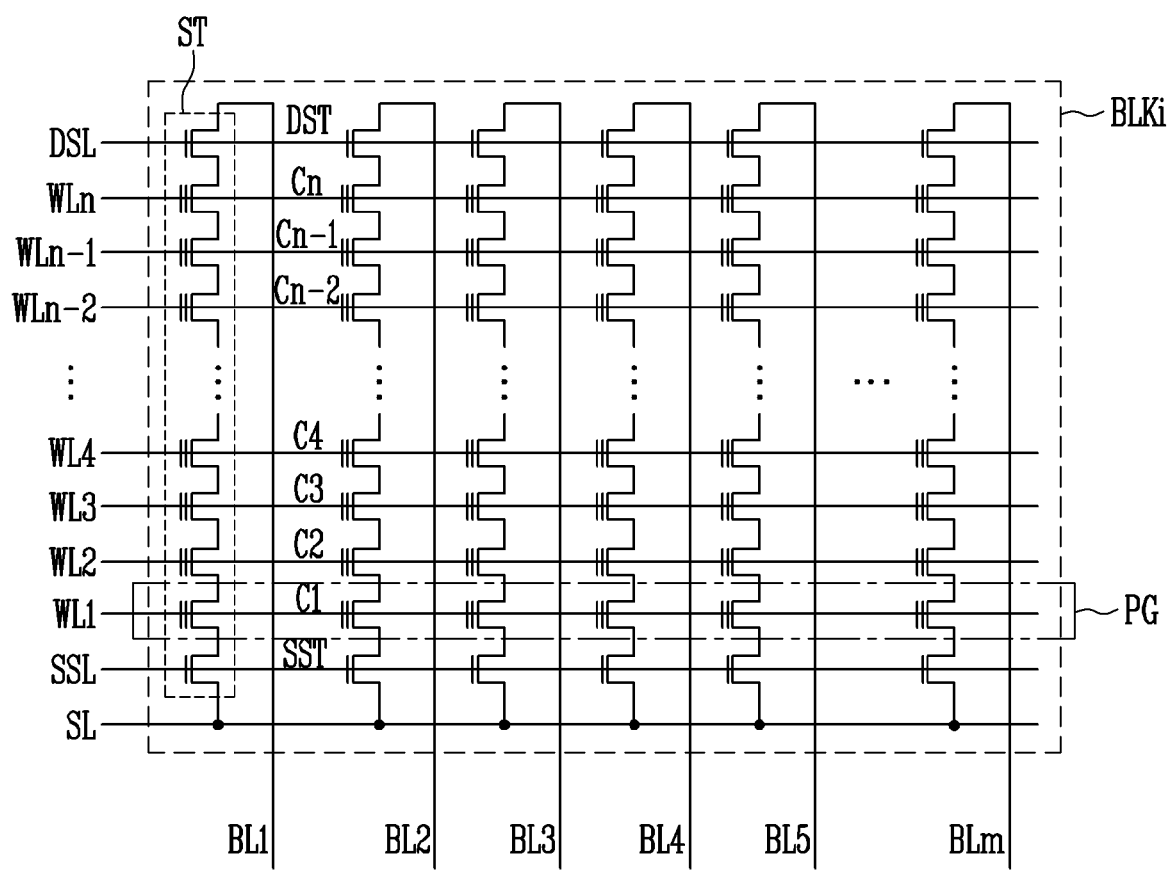
FIG. 4 is a diagram illustrating a memory block shown in FIG. 3, in accordance with an embodiment of the present disclosure.

FIG. 4 is a diagram illustrating the memory block shown in FIG. 3, in accordance with an embodiment of the present disclosure.

Referring to FIG. 4, a memory block BLKi among the plurality of memory blocks BLK1 to BLKi shown in FIG. 3 is illustrated as an embodiment.

The memory block BLKi may include a plurality of strings ST connected between first to mth bit lines BL1 to BLm (where m is a positive integer) and a source line SL. Each of the strings ST may include a source select transistor SST, first to nth memory cells C1 to Cn, and a drain select transistor DST, which are connected in series between the source line SL and the first to mth bit lines BL1 to BLm.

Since the memory block BLKi shown in FIG. 4 is a diagram illustrating a configuration of the memory block, the number of the source select transistor SST, the first to nth memory cells C1 to Cn, and the drain select transistor DST is not limited to that shown in FIG. 4.

Gates of source select transistors SST connected to different strings ST may be connected to a source select line SSL, gates of first to nth memory cells C1 to Cn connected to different strings ST may be respectively connected to first to nth word lines WL1 to WLn, and gates of drain select transistors DST connected to different strings ST may be connected to a drain select line DSL.

A group of memory cells which are connected to the same word line and are included in different strings ST may constitute one page PG. A program operation and a read operation may be performed in units of pages PG.

The memory cells included in the memory block BLKi may be programmed to various states according to a program method. For example, the program operation may be performed by using a single level cell (SLC) method, a multi-level cell (MLC) method, a triple level cell (TLC) method, or a quadruple level cell (QLC) method. The SLC method is a method in which 1-bit data is stored in one memory cell. The MLC method is a method in which 2-bit data is stored in one memory cell. The TLC method is a method in which 3-bit data is stored in one memory cell. The QLC method is a method in which 4-bit data is stored in one memory cell. In addition, 5 or more-bit data may be stored in one memory cell.

Figure 5:
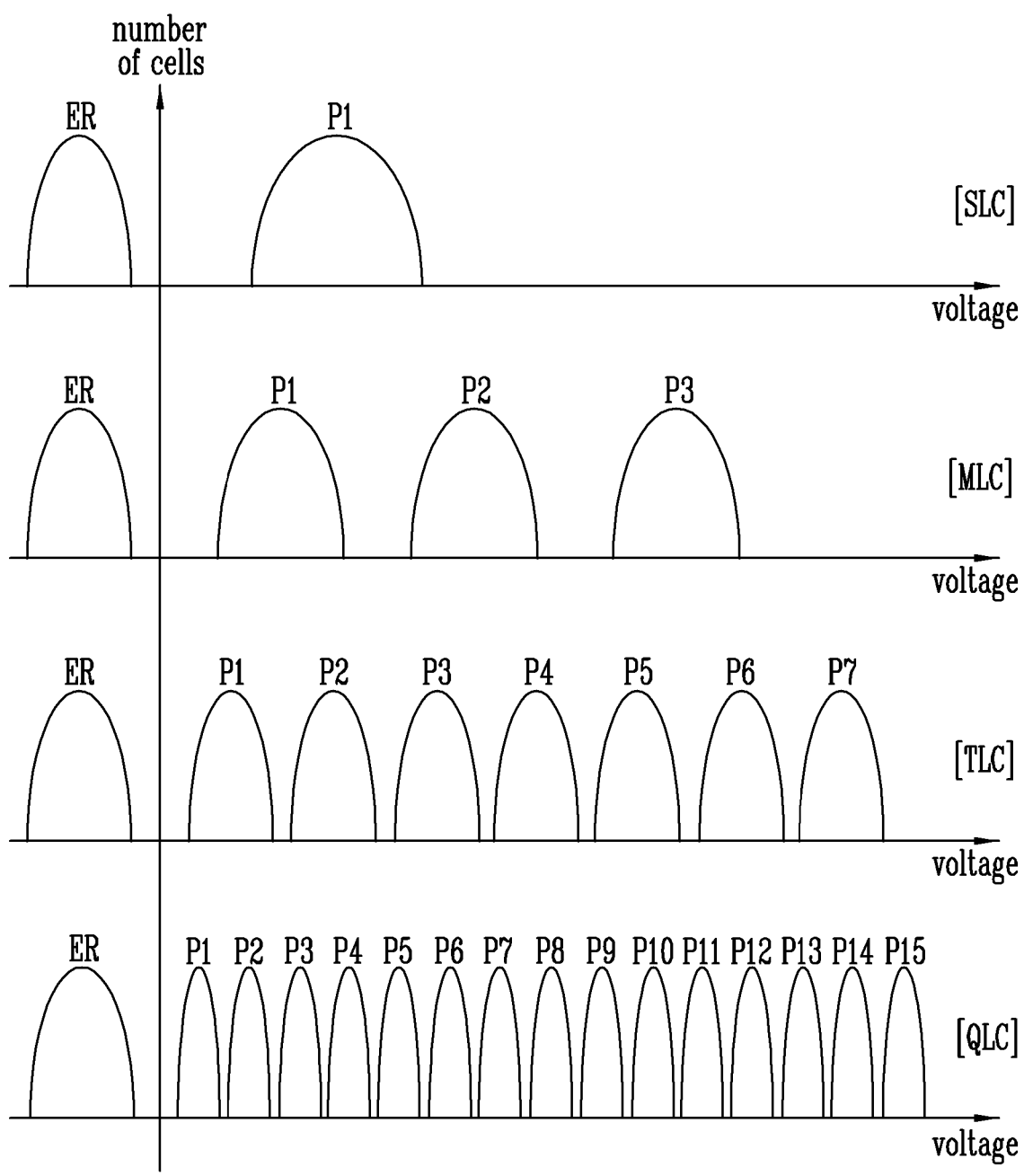
FIG. 5 is a diagram illustrating threshold voltage distributions of memory cells programmed according to various methods.

FIG. 5 is a diagram illustrating threshold voltage distributions of memory cells programmed according to various methods.

Referring to FIG. 5, threshold voltage distributions of memory cells with respect to the respective SLC, MLC, TLC, and QLC methods are illustrated. In the SLC method, the memory cells may be programmed to an erase state ER or a first program state P1. In the MLC method, the memory cells may be programmed to the erase state ER, a first program state P1, a second program state P2, or a third program state P3 according to 2-bit data configured with least significant bit (LSB) data and most significant bit (MSB) data. The LSB and MSB data are different logical page data, and may be stored in one physical page. For example, the LSB data may be stored as least significant bit data in a selected page, and the MSB data may be stored as most significant bit data in the selected page. Each of memory cells included in the selected page may become the erase state ER, the first program state P1, the second program state P2, or the third program state P3 according to the LSB data and the MSB data. In the TLC method, the memory cells may be programmed to the erase state ER or any state among first to seventh program states P1 to P7 according to 3-bit data configured with least significant bit (LSB) data, central significant bit (CSB) data, and most significant bit (MSB) data. In the QLC method, the memory cells may be programmed to the erase state ER or any state among first to fifteenth program states P1 to P15 according to 4-bit data configured with least significant bit (LSB) data, first central significant bit (CSB) data, second CSB data, and most significant bit (MSB) data.

As described above, 1-bit data is stored in one memory cell in the SLC method, and 3-bit data is stored in one memory cell in the TLC method. Therefore, when a migration operation is performed, 3-bit data stored in three memory cells by using the SLC method may be moved into one memory cell by using the TLC method.

Figure 6:
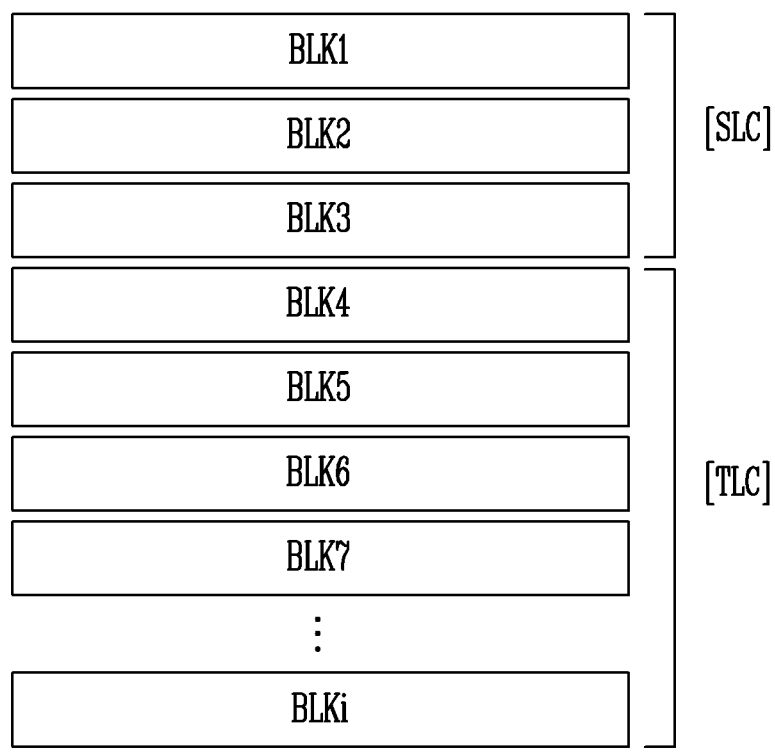
FIG. 6 is a diagram illustrating memory blocks in accordance with an embodiment of the present disclosure.

FIG. 6 is a diagram illustrating memory blocks in accordance with an embodiment of the present disclosure.

Referring to FIG. 6, some memory blocks among the first to ith memory blocks BLK1 to BLKi included in the memory device may be set to be used for a program operation using the SLC method, and the other memory blocks among the first to ith memory blocks BLK1 to BLKi included in the memory device may be set to be used for a program operation using the TLC method. For example, the first to third memory blocks BLK1 to BLK3 may be set as SLC blocks, and the fourth to ith memory blocks BLK4 to BLKi may be set as TLC blocks. Data output from the host in a program operation according to a request of the host may be stored in the SLC blocks, and data received from the controller in a migration operation may be stored in the TLC blocks. That is, the data stored in the SLC blocks may be migrated into the TLC blocks. Although the memory blocks included in the SLC or TLC blocks are configured with nonvolatile memory cells, data stored in the memory cells may be changed as time elapses. That the data is changed means that the number of electrons trapped in the memory cells decreases. Therefore, the threshold voltage of the memory cells may be lowered.

Figure 7:
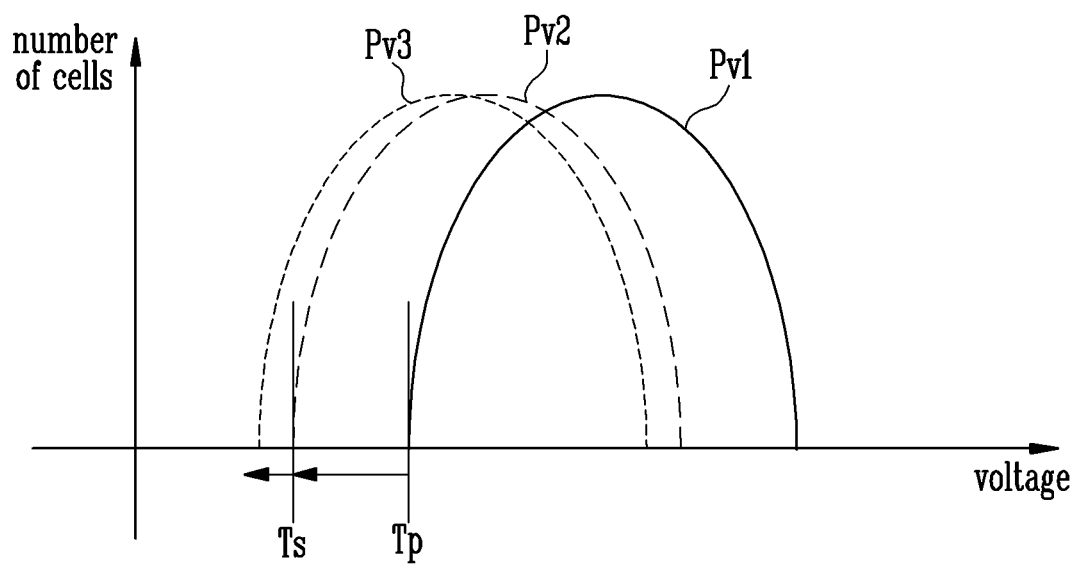
FIG. 7 is a diagram illustrating a change in threshold voltage of programmed memory cells.

FIG. 7 is a diagram illustrating a change in threshold voltage of programmed memory cells.

Referring to FIG. 7, the threshold voltage of programmed memory cells may be lowered as time elapses, due to various reasons such as leakage of electrons. In FIG. 7, a time at which a program operation is completed is a program completion time Tp, and a threshold voltage of memory cells at the program completion time Tp is a first threshold voltage Pv1. The number of electrons trapped in memory cells may gradually decrease as time elapses after the program completion time Tp. For example, the number of electrons trapped in the memory cells may have a largest decrement during a specific amount of time Ts after the program completion time Tp, and have a decrement decreasing after the specific amount of time Ts. That is, since the number of electrons trapped in the memory cells just after the program operation is completed decreases during the specific amount of time Ts from the program completion time Tp, the threshold voltage of the memory cells may be rapidly lowered from the first threshold voltage Pv1 to a second threshold voltage Pv2, and slowly lowered from the second threshold voltage Pv2 to a third threshold voltage Pv3 after the specific amount of time Ts.

That is, a variation of the threshold voltage is relatively large between the program completion time Tp and the specific amount of time Ts, and is relatively small from after the specific amount of time Ts. When the variation of the threshold voltage is large, the number of fail data included in read data increases when a read operation is performed. Hence, an operation of again setting a read voltage may be performed several times, and therefore, the amount of time required to perform the read operation may increase.

Figure 8:
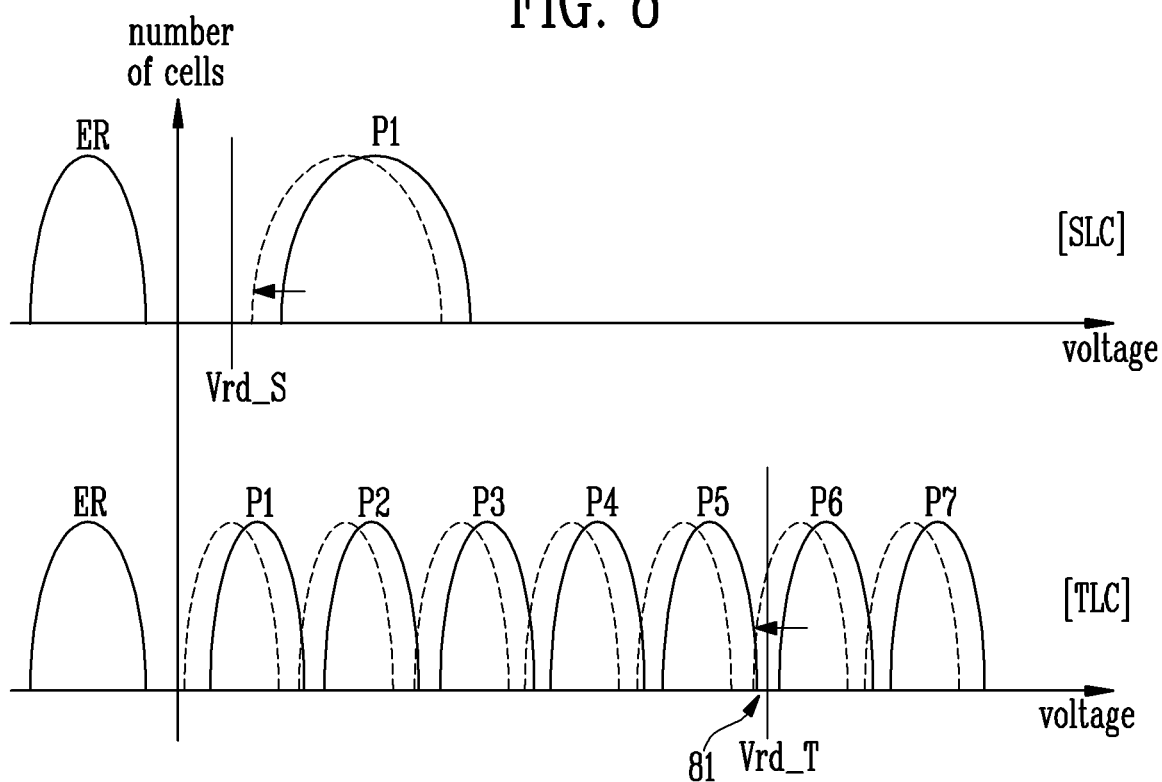
FIG. 8 is a diagram for describing why the speed of a read operation of the memory system is decreased.

FIG. 8 is a diagram for describing why the speed of a read operation of the memory system is decreased.

Referring to FIG. 8, threshold voltages of memory cells included in SLC and TLC blocks will be compared as follows.

Since 1-bit data is stored in one memory cell in the SLC blocks, the probability is low that a first threshold voltage P1 is lower than an SLC read voltage Vrd_S even when the first threshold voltage P1 is lowered after a program operation is completed. That is, in the SLC blocks, a voltage difference between a threshold voltage of the erase state ER and a threshold voltage of the first program state P1 is relatively large, and hence a margin between the SLC read voltage Vrd_S and the first threshold voltage P1 is relatively large. Therefore, although the threshold voltage is lowered during a specific amount of time after the program operation, the number of fail data included in read data may be relatively small.

Since 3-bit data is stored in one memory cell in the TLC blocks, an interval between first to seventh threshold voltages P1 to P7 is narrower than that of the SLC blocks. That is, in the TLC blocks, a voltage difference between different threshold voltages is relatively small, and hence a threshold voltage which should be higher than a TLC read voltage Vrd_T, may be lower than the TLC read voltage Vrd_T. For example, when the TLC read voltage Vrd_T is a voltage between the fifth threshold voltage P5 and the sixth threshold voltage P6, some memory cells 81 having the sixth threshold voltage P6 may be erroneously read as memory cells having the fifth threshold voltage P5. Data read from these memory cells corresponds to a fail bit, and therefore, the controller may perform an operation for searching for a read voltage suitable for a changed threshold voltage. The amount of time required to perform the operation for searching for the read voltage may increase as a voltage difference between threshold voltages before and after the change becomes larger. Therefore, the amount of time required to perform a read operation may increase until the read voltage suitable for the changed threshold voltage is searched.

Accordingly, in this embodiment, when a read operation is performed after a migration operation, an SLC block or a TLC block may be selected based on a specific amount of time after the migration operation, and the read operation of the selected block may be performed.

In this embodiment, after a program operation is performed on an SLC block according to a request of the host, data is reprogrammed from the SLC block to a TLC block in a migration operation. However, this is an embodiment for helping to understand the present disclosure, and therefore, an MLC or QLC block may be used instead of the TLC block.

Figure 9:
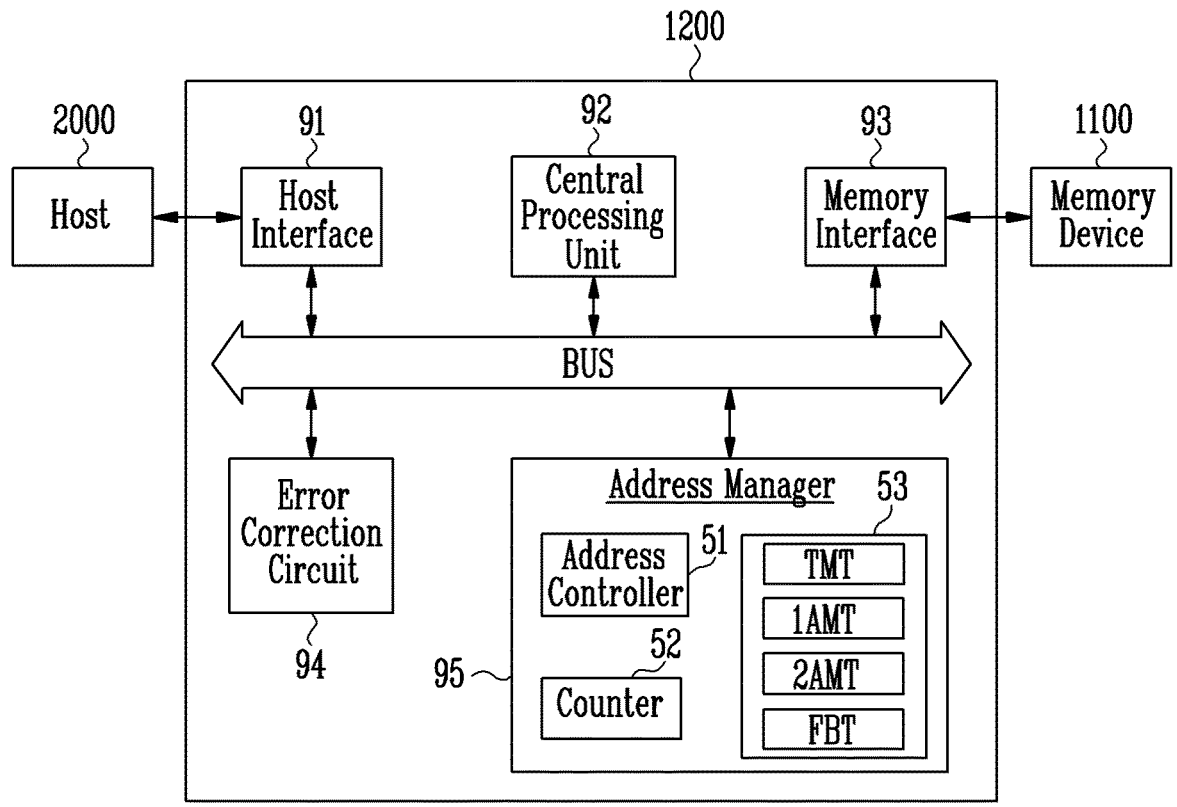
FIG. 9 is a diagram illustrating a controller in accordance with an embodiment of the present disclosure.

FIG. 9 is a diagram illustrating a controller in accordance with an embodiment of the present disclosure.

Referring to FIG. 9, the controller 1200 may include a host interface 91, a central processing unit 92, a memory interface 93, an error correction circuit 94, and an address manager 95. The host interface 91, the central processing unit 92, the memory interface 93, the error correction circuit 94, and the address manager 95 may communicate with each other through a bus.

The host interface 91 may transmit/receive a request, an address, and data between the host 2000 and the controller 1200. An address which the host interface 91 transmits/receives to/from the host 2000 may be a logical address.

The central processing unit 92 may control devices included in the controller 1200 according to a request of the host 2000, or control devices included in the controller 1200 to manage the memory device 1100 even when any request of the host 2000 does not exist.

The memory interface 93 may communicate between the controller 1200 and the memory device 1100. An address which the memory interface 93 transmits/receives to/from the memory device 1100 may be a physical address. In a program operation, the memory interface 93 may output a program command, an address, and data to the memory device 1100. In a read operation, the memory interface 93 may output a program command and an address to the memory device 1100, and receive data read from the memory device 1100.

The error correction circuit 94 may determine whether an error has occurred in data read from the memory device 1100. For example, the error correction circuit 94 may determine a read operation as a fail when the number of error bits detected from the read data is greater than a reference number, and determine the read operation as a pass when the number of error bits is the reference number or less. When the error correction circuit 94 determines the read operation as the fail, the central processing unit 92 may perform an operation of searching for a read voltage. When the error correction circuit 94 determines the read operation as the pass, the central processing unit 92 may transmit the read data to the host interface 91.

The address manager 95 may map physical and logical addresses in a program operation, and count an amount of time from when a migration operation is performed to a specific amount of time. During the specific amount of time, the same data may be kept as programmed in both of the SLC block and the TLC block despite the migration operation of migrating the data from the SLC block into the TLC block. After the specific amount of time, the same data may be erased from the SLC block while being kept as programmed in the TLC block. When a read operation is performed within the specific amount of time, the address manager 95 may output a physical address corresponding to the SLC block such that the same data can be read from the SLC block. When the read operation is performed after the specific amount of time, the address manager 95 may output a physical address corresponding to the TLC block such that the same data can be read from the TLC block. In order to perform the above-described operations, the address manager 95 may include an address controller 51, a counter 52, and a buffer 53.

The address controller 51 may control the counter 52 and the buffer 53 under the control of the central processing unit 92.

The counter 52 may count an amount of time from when the migration operation is performed to the specific amount of time, and store the counted amount of time in the buffer 53.

The buffer 53 may store a plurality of tables TMT, 1AMT, 2AMT, and FBT which store different information. For example, the buffer 53 may store a time table TMT, a first address map table 1AMT, a second address map table 2AMT, and a free block table FBT.

The counted amount of time and a table select value may be stored in the time table TMT. The counted amount of time stored in the time table TMT may be stored as a code configured with a plurality of bits, and may be updated by the counter 52 during the specific amount of time after the migration operation is performed. The table select value stored in the time table TMT may have a default value until before the counted amount of time stored in the time table TMT reaches the specific amount of time, and the default value may be changed to a valid value when the counted amount of time reaches the specific amount of time.

A logical address and a first physical address may be stored in the first address map table 1AMT. The first physical address may be an address of selected memory blocks among SLC blocks, and the logical address may be an address mapped to the first physical address.

A logical address and a second physical address may be stored in the second address map table 2AMT. The second physical address may be an address of selected memory blocks among TLC blocks, and the logical address may be an address mapped to the second physical address. The logical address stored in the second address map table 2AMT may be the same as that stored in the first address map table 1AMT.

Physical addresses of free blocks may be stored in the free block table FBT. The free blocks can store data among the memory blocks included in the memory device.

Figure 10:
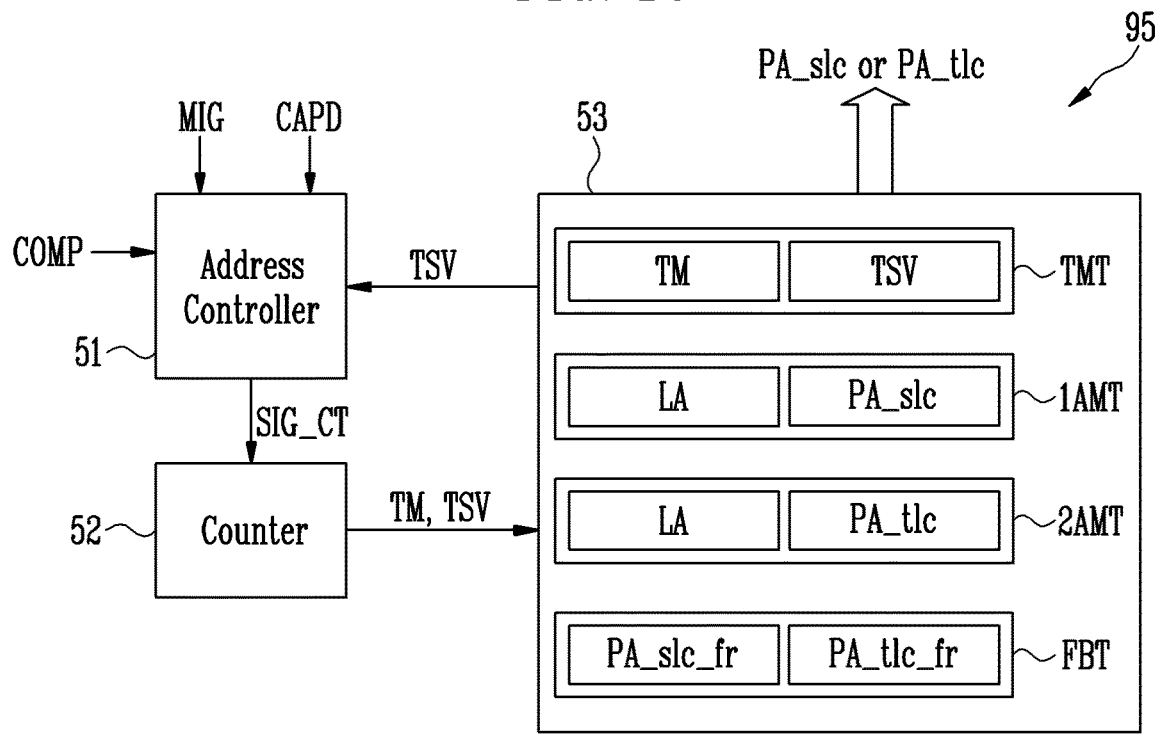
FIG. 10 is a diagram illustrating in detail an address manager in accordance with an embodiment of the present disclosure.

FIG. 10 is a diagram illustrating in detail the address manager in accordance with an embodiment of the present disclosure.

Referring to FIG. 10, the buffer 53 may store a time table TMT, a first address map table 1AMT, a second address map table 2AMT, and a free block table FBT. An amount of time TM counted by the counter 52 and a table select value TSV may be stored in the time table TMT. A logical address LA and a first physical address PA_slc may be stored in the first address map table 1AMT. The first physical address PA_slc may be a physical address allocated to an SLC block. A logical address LA and a second physical address PA_tlc may be stored in the second address map table 2AMT. The second physical address PA_tlc may be a physical address allocated to a TLC block. First free physical block addresses PA_slc_fr and second free physical addresses PA_tlc_fr may be stored in the free block table FBT. The first and second free physical addresses PA_slc_fr and PA_tlc_fr may be changed according to free blocks included in the memory device.

When a data capacity value CAPD is received, the address controller 51 may select a first physical address PA_slc corresponding to the data capacity value CAPD among the first free physical addresses PA_slc_fr stored in the free block table FBT, and store the first physical address PA_slc and a logical address LA mapped to the first physical address PA_slc in the first address map table 1AMT. Subsequently, the address controller 51 may output the selected first physical address PA_slc to the memory device 1100 for the memory device 1100 to program corresponding data into a SLC block corresponding to the selected first physical address PA_slc.

When a migration signal MIG is received, the address controller 51 may select a second physical address PA_tlc corresponding to the data capacity value CAPD among the second free physical addresses PA_tlc_fr stored in the free block table FBT, and store the second physical address PA_tlc and a logical address LA mapped to the second physical address PA_tlc in the second address map table 2AMT. Subsequently, the address controller 51 may output the selected second physical address PA_tlc to the memory device 1100 for the memory device 1100 to program, in the migration operation, corresponding data into a TLC block corresponding to the selected second physical address PA_tlc.

When a migration operation is completed, the central processing unit may output a migration completion signal COMP, and the address controller 51 may output a count signal SIG_CT in response to the migration completion signal COMP.

The counter 52 may output the counted amount of time TM, which is counted by the counter 52, in response to the count signal SIG_CT, and the counted amount of time TM output from the counter 52 may be stored in the time table TMT. The counter 52 may output the counted amount of time TM in the form of a code configured with a plurality of bits. The counter 52 may output the counted amount of time TM in units of seconds or minutes. When the counted amount of time TM does not yet reach the specific amount of time, the counter 52 may output a table select value TSV having a default value. When the counted amount of time TM is equal to the specific amount of time, the counter 52 may output a table select value TSV having a valid value. For example, the default value may be 0, and the valid value may be 1. However, this may be differently set according to the controller.

When a read request is received from the host, the address controller 51 may determine whether the counted amount of time TM reaches the specific amount of time. When a read operation of memory blocks corresponding to the logical address LA is performed while the counted amount of time TM does not yet reach the specific amount of time, the address controller 51 may output the first physical address PA_slc stored in the first address map table 1AMT. That is, when a read request is received from the host while the counted amount of time TM has not yet reached the specific amount of time, the address controller 51 may output the first physical address PA_slc. When the read operation of the memory blocks corresponding to the logical address LA is performed after the counted amount of time TM reaches the specific amount of time, the address controller 51 may output the second physical address PA_tlc stored in the second address map table 2AMT. Namely, when a read request is received from the host after the counted amount of time TM reaches the specific amount of time, the address controller 51 may output the second physical address PA_tlc. The first or second physical address PA_slc or PA_tlc may be selected according to the table select value TSV stored in the time table TM. Also, the address controller 51 may release the first address map table 1AMT after the counted amount of time TM reaches the specific amount of time.

In another embodiment, when a read request is received from the host after the specific amount of time elapses, the address controller 51 may selectively output a first physical address PA_slc or a second physical address PA_tlc according to the number of free blocks designated as SLC blocks. That is, when the read request is received from the host before the specific amount of time, the address controller 51 outputs the first physical address PA_slc as illustrated in the above-described example. However, when the read request is received from the host after the specific amount of time, the address controller 51 may selectively output the first physical address PA_slc or the second physical address PA_tlc according to the number of free blocks designated as the SLC blocks.

For example, when the read request is received from the host after the specific amount of time, the address controller 51 may output the second physical address PA_tlc when the number of free blocks designated as the SLC blocks is smaller than a reference number, and output the first physical address PA_slc when the number of free blocks designated as the SLC blocks is equal to or greater than the reference number. That is, since the reliability of a read operation of a memory block designated as an SLC block is higher than that of a read operation of a memory block designated as a TLC block, data stored in the SLC block may be read, when the number of free blocks designated as the SLC blocks is sufficient even though data is transmitted from the SLC block to the TLC block.

When the number of free blocks designated as the SLC blocks is less than the reference number, since the number of free blocks in which newly input data is stored is insufficient, Background operations (such as garbage collection) may be performed so as to ensure a sufficient number of free blocks. When the garbage collection is performed, a block on which a migration operation is performed may be selected as a block to be erased, among the SLC blocks. When a read request is received before addresses of memory blocks on which the garbage collection is performed are updated, the erased SLC block may be selected. To prevent selection of the erased SLC block, the address controller 51 may output the second physical address PA_tlc mapped to the TLC block instead of the first physical address PA_slc mapped to the SLC block during a read operation. For example, when the number of free blocks designated as the SLC blocks is less than the reference number, the address controller 51 may change the table select value TSV having a default value into the table select value TSV having a valid value so that the TLC block may be selected during the read operation.

The reference number may be set by the address controller 51, and the address controller 51 may compare the number of first free physical addresses PA_slc_fr stored in the free block table FBT with the reference number.

Figure 11A:
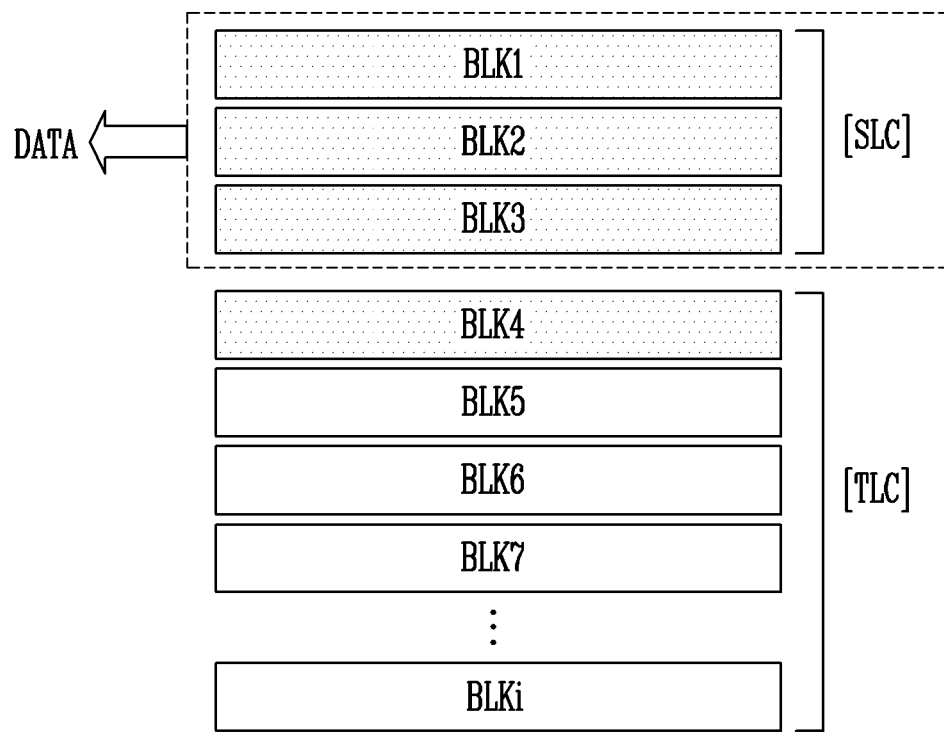
FIGS. 11A and 11B are diagrams illustrating a read operation according to a time after a migration operation is performed.
Figure 11B:
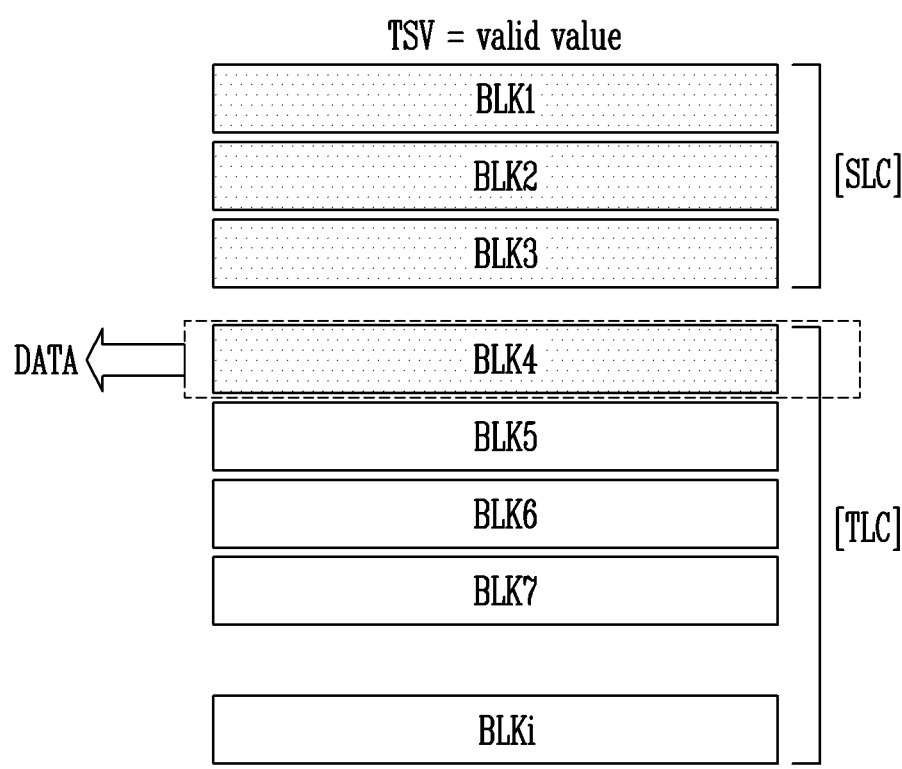

FIGS. 11A and 11B are diagrams illustrating a read operation according to a time after a migration operation is performed.

Referring to FIG. 11A, when the table select value TSV is the default value during the specific amount of time, a read operation of the first to third memory blocks BLK1 to BLK3 set as SLC blocks may be performed, so that data DATA of the first to third memory blocks BLK1 to BLK3 is output. That is, although the data is migrated by the migration operation from the first to third memory blocks BLK1 to BLK3 into the fourth memory block BLK4 set as a TLC block, the read operation on the first to third memory blocks BLK1 to BLK3 instead of the fourth memory block BLK4 may be performed when the read operation is performed within the specific amount of time.

To this end, in this embodiment, after the data of the first to third memory blocks BLK1 to BLK3 is migrated by the migration operation into the fourth memory block BLK4 set to the TLC block, an erase operation of the first to third memory blocks BLK1 to BLK3 is not performed during the specific amount of time. The erase operation of the first to third memory blocks BLK1 to BLK3 may be performed after the specific amount of time elapses from when the migration operation is performed.

A change in threshold voltage may frequently occur in the fourth memory block BLK4 set as the TLC block during the specific amount of time after the migration operation is performed as described above. Therefore, when a read operation of the fourth memory block BLK is performed in the specific amount of time, an operation for searching for a read voltage may be performed several times. This operation may increase the amount of time required to perform the read operation, and hence the read operation in a period in which a variation of the threshold voltage is large, is performed in memory blocks set as SLC blocks.

Alternatively, when the number of free blocks among the memory blocks set as the SLC blocks is sufficient, the read operation may be performed in the memory blocks set as the SLC blocks regardless of the table select value TSV, until data is stored in all memory blocks set as SLC blocks.

Referring to FIG. 11B, when the table select value TSV is the valid value after the specific amount of time, the read operation of the fourth memory block BLK4 set as the TLC block is performed, so that data DATA stored in the fourth memory block BLK4 is output. That is, since data is erased from the first to third memory blocks BLK1 to BLK3 after the specific amount of time, the read operation on the fourth memory block BLK4 may be performed when the read operation is performed after the specific amount of time.

The erase operation of the first to third memory blocks BLK1 to BLK3 may be performed after the specific amount of time. For example, the erase operation of the first to third memory blocks BLK1 to BLK3 may be performed when any request output from the host does not exist or when the number of commands executed in the controller is less than a reference number.

After the specific amount of time elapses from when the migration operation is performed, the controller may release memory blocks in which data is stored among the memory blocks set as the SLC blocks. For example, the controller may control the memory device to perform an erase operation of memory blocks on which the migration operation is performed among the SLC blocks.

FIG. 12 is a flowchart illustrating an operating method of the memory system in accordance with an embodiment of the present disclosure.

Referring to FIG. 12, when a program request is output from the host, the controller may program data transmitted from the host in SLC blocks (S121). The controller may store a physical address corresponding to the SLC block in the first address map table (1AMT shown in FIG. 10).

When the program operation according to the request of the host is completed, the controller may perform a migration operation of migrating the data from the SLC block to a TLC block (S122). The controller may store a physical address corresponding to the TLC block, into which the data is migrated, in the second address map table (2AMT shown in FIG. 10).

When the migration operation is completed, the controller may count an amount of time, and store the counted amount of time in the time table (TMT shown in FIG. 10) (S123).

The controller may compare the counted amount of time with a specific amount of time (S124). When the counted amount of time does not reach the specific amount of time (NO), the controller may determine whether a read command has been generated (S126). The read command may be a command for performing a read operation on a logical address mapped to the physical address in operation S121 or S122.

When the counted amount of time reaches the specific amount of time in operation S124 (YES), the controller may store a table select value TSV having a valid value (S125). For example, the controller may store the table select value TSV having the valid value in the time table (TMT shown in FIG. 10).

When the table select value TSV is stored in the time table TMT, the controller may determine whether the read command has been generated (S126).

When it is determined that the read command is not generated in operation S126, the controller may repeat the operations S123 to S126 until the read command is generated. While the operations S123 to S126 are repeated, the counted amount of time may be updated in a set time unit, and the table select value TSV may be stored as the default value or the valid value according to the updated time and the specific amount of time.

When the read command is generated in operation S126, the controller may check the table select value TSV stored in the time table TMT (S127).

In operation S127, when the table select value TSV is the default value, this corresponds to a period in which a variation of a threshold voltage is large. Therefore, the controller may select the first address map table 1AMT (S128).

In operation S127, when the table select value TSV is the valid value, this corresponds to a period in which the variation of the threshold voltage is small, and therefore, the controller may select the second address map table 2AMT (S129).

Subsequently, the controller may output a physical address PA stored in the selected address map table AMT among the first and second address map tables 1AMT and 2AMT (S130).

The controller may transmit the physical address output in operation S130 and the read command to the memory device, and perform a read operation according to the read command and the physical address (S131).

Figure 13:
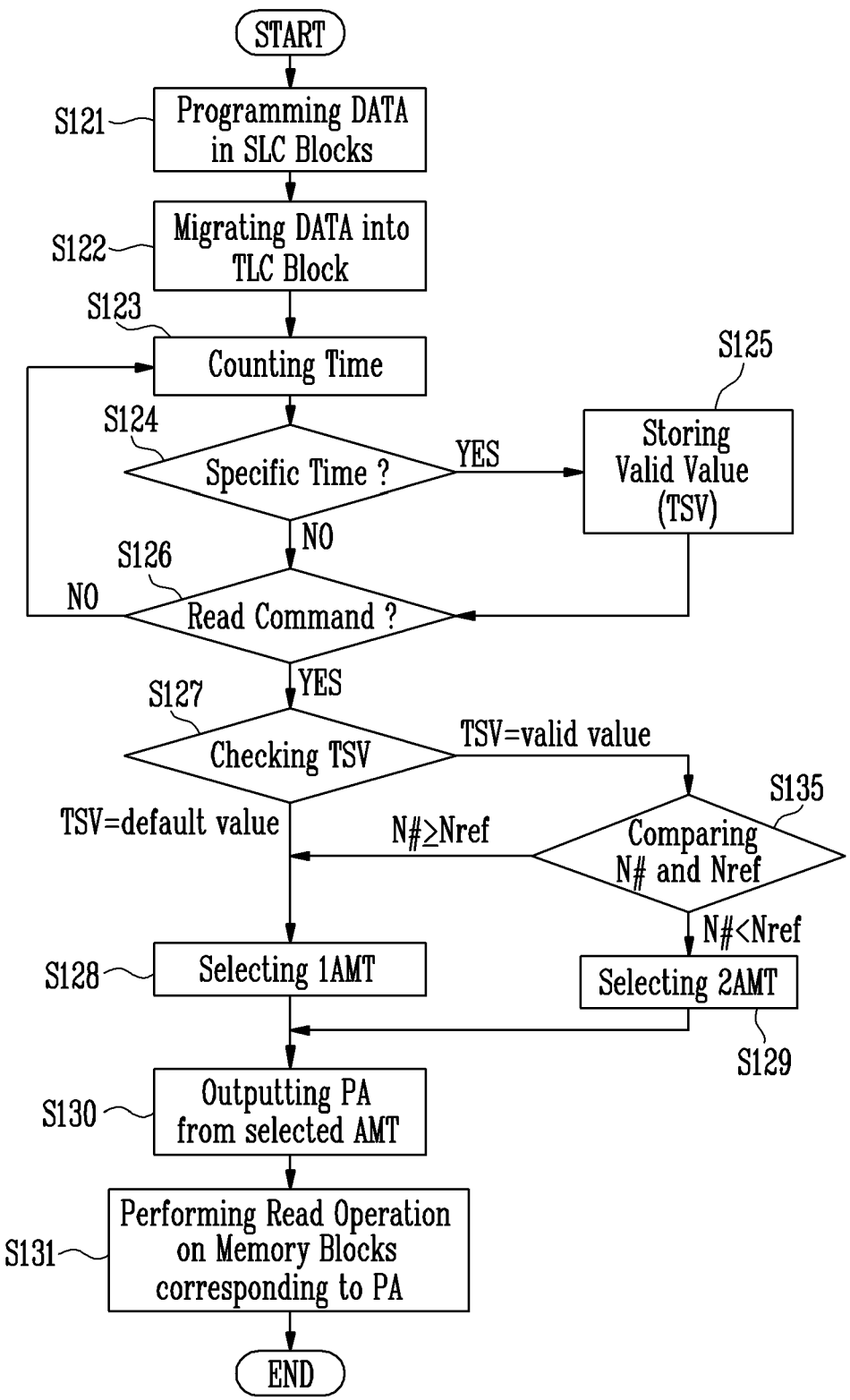
FIG. 13 is a flowchart illustrating an operating method of the memory system in accordance with another embodiment of the present disclosure.

FIG. 13 is a flowchart illustrating an operating method of the memory system in accordance with another embodiment of the present disclosure.

Referring to FIG. 13, the operating method of the memory system in accordance with the another embodiment of the present disclosure is similar to the operating method described with reference to FIG. 12, but the operating method of the memory system in accordance with the another embodiment of the present disclosure is different from the operating method described with reference to FIG. 12, in some steps after the step S127. Therefore, hereinafter, descriptions of steps overlapping with those described with reference to FIG. 12 will be omitted.

In the another embodiment of the present disclosure, when the table select value TSV is the valid value in the step 127, the second address map table 2AMT is not selected, but an operation of comparing a number N #of free memory blocks designated as SLC blocks with a reference number Nref may be performed (S135).

For example, when the table select value TSV is the valid value in the step 127, the controller may compare the number N #of free memory blocks designated as the SLC blocks with the reference number Nref (S135).

In the step S135, when the number N #of free memory blocks designated as the SLC blocks is equal to or greater than the reference number Nref (N #Nref), the step S128 may be performed. The first address map table 1AMT for SLC blocks may be selected in the step S128.

In the step S135, when the number N #of free memory blocks designated as the SLC blocks is smaller than the reference number Nref (N #<Nref), the step S129 may be performed. The second address map table 2MT for TCL blocks may be selected in the step S129.

Figure 14:
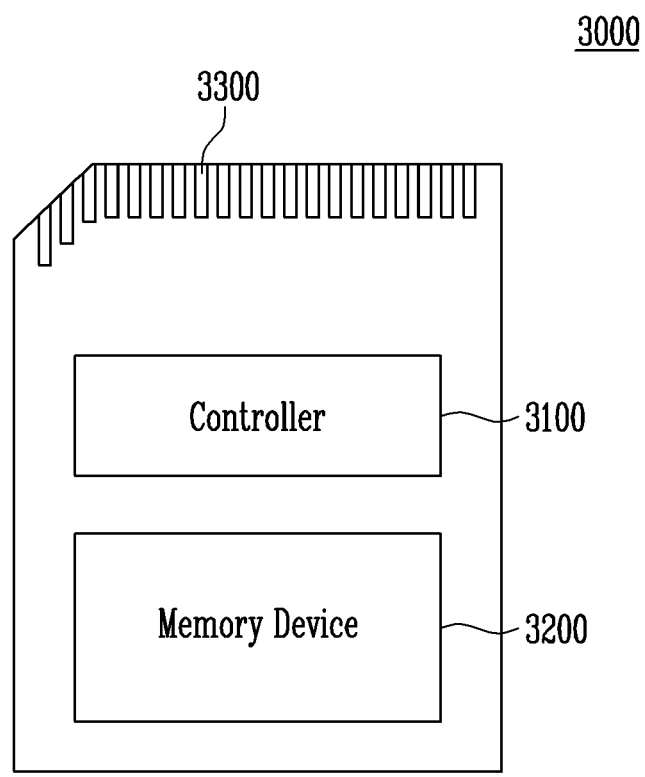
FIG. 14 is a diagram illustrating a memory card system to which the controller of the present disclosure is applied.

FIG. 14 is a diagram illustrating a memory card system to which the controller of the present disclosure is applied.

Referring to FIG. 14, the memory card system 3000 includes a controller 3100, a memory device 3200, and a connector 3300.

The controller 3100 may be connected to the memory device 3200. The controller 3100 may access the memory device 3200. For example, the controller 3100 may control a program, read or erase operation, or control a background operation of the memory device 3200. The controller 3100 may provide an interface between the memory device 3200 and a host. Also, the controller 3100 may drive firmware for controlling the memory device 3200. The controller 3100 may be implemented identical to the controller 1200 described with reference to FIG. 9.

The controller 3100 may include components such as a Random Access Memory (RAM), a processing unit, a host interface, a memory interface, and the error corrector.

The controller 3100 may communicate with an external device through the connector 3300. The controller 3100 may communicate with the external device (e.g., the host) according to a specific communication protocol. The controller 3100 may communicate with the external device through at least one of various communication standards or interfaces such as, a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), Wi-Fi, Bluetooth, and NVMe.

The memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The controller 3100 and the memory device 3200 may be integrated into a single semiconductor device, to constitute a memory card. For example, the controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 15:
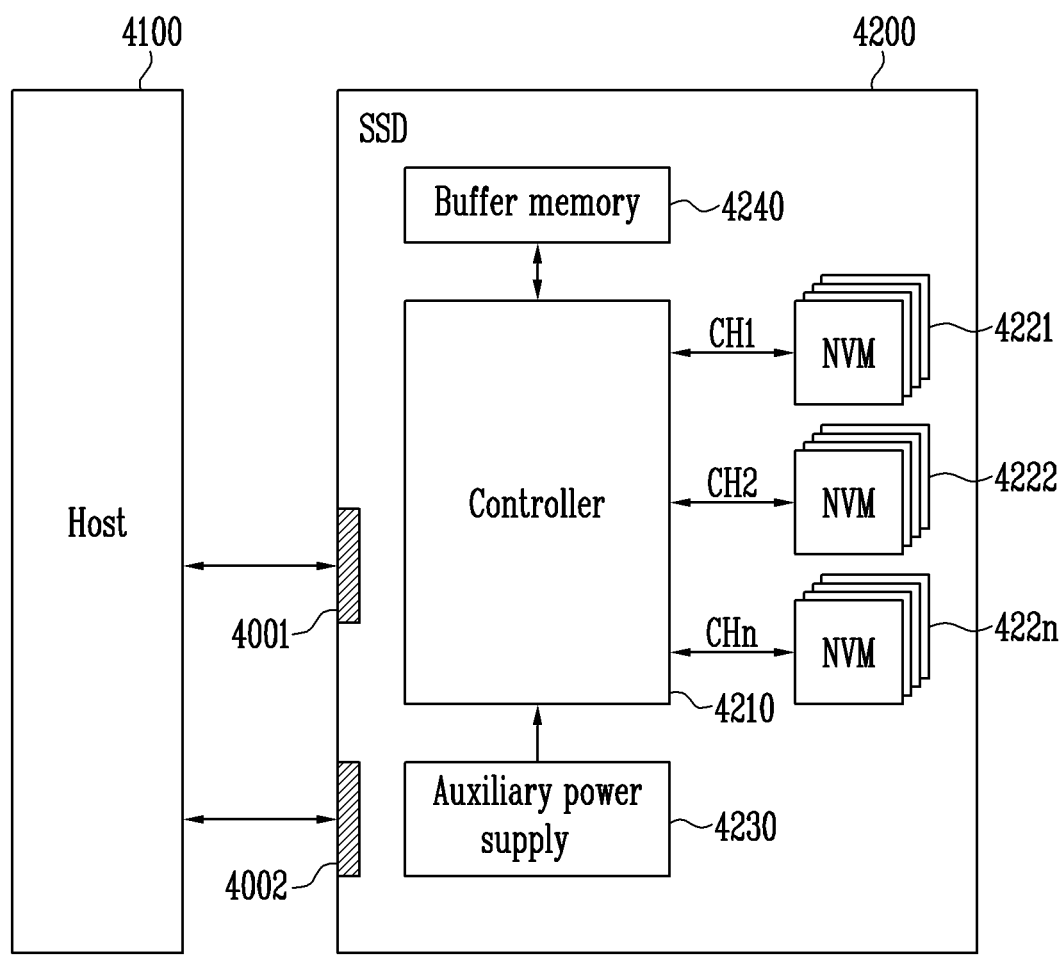
FIG. 15 is a diagram illustrating a Solid State Drive (SSD) system to which the controller of the present disclosure is applied.

FIG. 15 is a diagram illustrating a Solid State Drive (SSD) system to which the controller of the present disclosure is applied.

Referring to FIG. 15, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422n, an auxiliary power supply 4230, and a buffer memory 4240.

In accordance with an embodiment of the present disclosure, the SSD controller 4210 may perform a function of the controller 1200 described with reference to FIG. 9.

The SSD controller 4210 may control the plurality of flash memories 4221 to 422n in response to a signal received from the host 4100. The signal may be a signal based on an interface between the host 4100 and the SSD 4200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power to the SSD 4200. The auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422n, or temporarily store meta data (e.g., a mapping table) of the flash memories 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In accordance with the present disclosure, the speed of a read operation can be increased in the memory system which performs a migration operation.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Moreover, the embodiments of the present disclosure have been described in the drawings and specification. Although specific terminologies are used here, those are only to describe the embodiments of the present disclosure.

Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory system comprising:
a memory device including first memory blocks, within which a single bit is to be programmed into a memory cell by using a single level cell (SLC) method, and second memory blocks, within which two or more bits are to be programmed into a memory cell by using a multi-level cell (MLC)-or-more method; and
a controller configured to program first data in the first memory blocks by using the SLC method and then migrate the first data from the first memory blocks into the second memory blocks by using the MLC-or-more method,
wherein the controller is further configured to:
read the first data from the first memory blocks when a read request for the first data is received from a host within a specific amount of time after the migration;
when the read request for the first data is received from the host after the specific amount of time after the migration and when a number of free blocks among the first memory blocks is greater than a reference number, read the first data from the first memory blocks; and
when the read request for the first data is received from the host after the specific amount of time after the migration and the number of the free blocks among the first memory blocks is smaller than the reference number, read the first data from the second memory blocks.

2. The memory system of claim 1, wherein the second memory blocks are set such that data is programmed by using a multi-level cell (MLC), triple level cell (TLC), or quadruple level cell (QLC) method.

3. The memory system of claim 1, wherein the controller stores:
a first address map table configured to store first physical addresses corresponding to the first memory blocks, and
a second address map table configured to store second physical addresses corresponding to the second memory blocks.

4. The memory system of claim 3, wherein, when the read request for the first data is received from the host within the specific amount of time, the controller reads the first memory blocks by outputting the first physical addresses stored in the first address map table.

5. The memory system of claim 3, wherein, when the read request for the first data is received from the host after the specific amount of time, the controller compares the number of the free blocks included in the first memory blocks with the reference number, and outputs the first physical addresses stored in the first address map table or outputs the second physical addresses stored in the second address map table, based on the result of the comparison.

6. The memory system of claim 5, wherein, when the number of the free blocks included in the first memory blocks is greater than the reference number, the controller outputs the first physical addresses stored in the first address map table.

7. The memory system of claim 5, wherein, when the number of the free blocks included in the first memory blocks is smaller than the reference number, the controller outputs the second physical addresses stored in the second address map table.

8. The memory system of claim 1, wherein the controller maintains the first data stored in the first memory blocks, until before the number of the free blocks included in the first memory blocks is smaller than the reference number after the first data is migrated into the second memory blocks.

* * * * *